Apr. 10, 1923.
W. G. MUNKEL
TOILET HOPPER
Filed Oct. 11, 1919
1,451,430
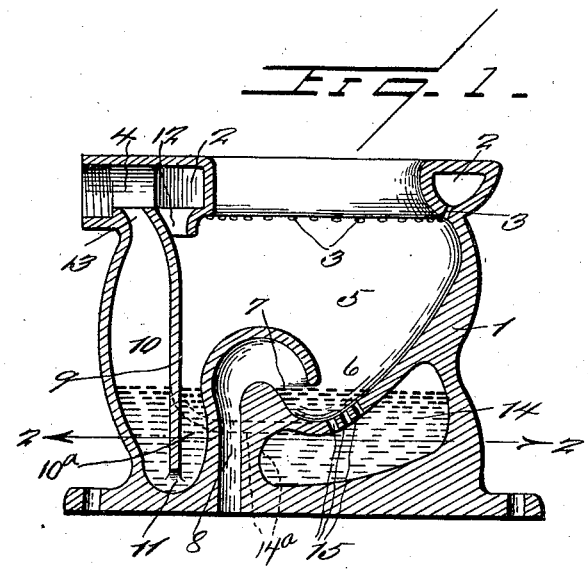
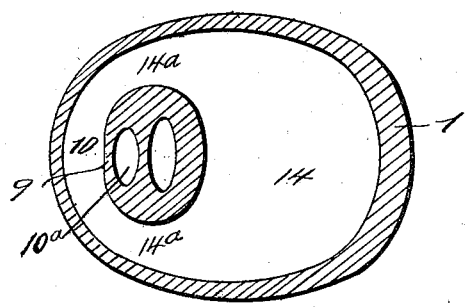

Patented Apr. 10, 1923.

1,451,430

UNITED STATES PATENT OFFICE.

WALTER G. MUNKEL, OF ANAMOSA, IOWA.

TOILET HOPPER.

Application filed October 11, 1919. Serial No. 329,981.

*To all whom it may concern:*

Be it known that I, WALTER G. MUNKEL, a citizen of the United States, residing at Anamosa, in the county of Jones and State of Iowa, have invented certain new and useful Improvements in Toilet Hoppers, of which the following is a specification, reference being had to the accompanying drawings.

This invention relates to an improved toilet hopper, and an object of the invention is to provide a very simple, efficient and practical hopper, which when manufactured, may be produced for a relatively low cost and sold at a reasonable profit.

Another object of the invention is the provision of a hopper especially designed to use in connection with combination flush tank and valve, which is set forth, illustrated and claimed in the United States patent hereinafter mentioned.

A further object of the invention is to provide a hopper including a water storage compartment, whereby the bowl of the hopper may be refilled.

A still further object of the invention is the provision of a space communicatively connected with the water storage space and disposed under the bowl of the hopper, to receive water, so that the water therein may pass through the openings in the bottom portion of the bowl of the hopper, so that the bottom of the bowl may be cleaned, when the hopper is flushed.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view through the hopper, showing the same constructed in accordance with the invention.

Figure 2 is a transverse sectional view on line 2—2 of Figure 1.

Referring more especially to the drawings, 1 designates a hopper, which may be any suitable shape or configuration, preferably as shown. Adjacent the upper marginal portion of the hopper a water channel or space 2 is formed, there being a plurality of apertures or openings 3 in the wall of this space 2, so that the water when allowed to enter the space 2 through the passage 4, will flow into the interior 5 of the bowl 6 of the hopper. This bowl is formed downwardly into the hopper and communicatively connects with the trap 7. The trap 7 terminates in an outlet 8, to which any suitable form or construction of soil pipe (not shown) may be connected. The hopper is provided with a partition wall 9, at the rear of the hopper, and by means of this wall a water storage space 10 is formed. The lower part of the wall 9 is provided with an aperture or opening 11, to permit the water to rise upwardly into the space 10$^a$ (which connects the storage space 10 and the bowl of the hopper), particularly when the flushing valve described and claimed in the co-pending application is closed. The passage 4, by means of the openings 12 and 13 communicatively connect with the interior of the bowl and the water storage space 10. A water receiving space 14 (which connects or communicates with the space 10, as at 14$^a$, shown by the dotted lines in Figure 1 and by the full lines in Figure 2) is formed under the bottom of the bowl of the hopper, and from this space the water is allowed to rush through the openings or apertures 15 formed in the bottom of the bowl, for the purpose of cleansing the bottom of the bowl, particularly that portion imediately adjacent the entrance to the trap.

In flushing the hopper it is to be understood that the water for flushing the hopper is under sufficient pressure, it being supplied from a flush tank similar to that disclosed in the United States patent to Walter G. Munkel, issued May 31, 1921, Patent No. 1,379,712. The space 14 in the lower part of the hopper is designed to be relatively small, in fact constructed as a water passage. It is to be borne in mind that the space 14 is designed to be relatively small, in fact smaller than the space 10 and when the tank is flushed it carries a supply of water of sufficient pressure and weight from the flush tank shown in the aforesaid patent, through the passage 13, the space 10, through the communicating spaces or passages 14$^a$, and then through the passage or space 14 and thereby causing jets of water to pass through the openings 15. The spaces or passages 14ª are designed to be relatively large, in fact considerably larger than the apertures or openings 15, which are designed to be relatively small and so constructed and arranged that the impurities will not pass therethrough. Furthermore the space or opening 13 is designed to be larger than the opening 11. The water from the flush tank disclosed in the aforesaid patent first passes through the inlet 13 when the tank is flushed, thus causing the first supply of water to accumulate in the space 10. When the space 10 is supplying water, the surplus water passes over the wall 9 into the space 2 and flows through the openings 12 and 3.

The invention having been set forth, what is claimed as new and useful is:

1. A hopper, comprising a body having a bowl terminating in an outlet trap, said body having a water receiving space extending under the bowl and around the rear of the trap, said hopper body having supply water inlets at the upper rear portion of the hopper for directing a supply of water into the space and into the bowl, the rear portion of the space having a passage extending upwardly at the rear of the trap and communicatively connecting with the bowl, whereby as a supply of water enters the space at the upper rear portion thereof, the water at the bottom of the space is forced upwardly through the passage and into the bowl and carried off by way of the trap passage, the bottom of the bowl adjacent the portion of the space under the bowl having apertures, through which water may pass and be directed toward and through the trap to assist in carrying off the water and the refuse.

2. As an article of manufacture, a hopper comprising a body having a bowl terminating in an outlet trap, a water storage space at the back of the trap and being communicatively connected with the interior of the bowl, said space extending under the bowl, the portion of said space under the bowl having apertures of communication with the bottom of the bowl, whereby the bottom of the bowl may be cleansed, and jets of water directed toward and through the trap.

3. As an article of manufacture, a hopper comprising a body having a bowl provided with an outlet trap including an outlet passage extending from the trap, a water storage space below the bottom of the bowl, the bottom of the bowl having apertures connecting the trap and the water storage space to permit water under pressure to pass through the bottom toward and through the trap for cleansing the same, said water storage space extending around the sides of the walls of said outlet passage to the rear of the body of the hopper and terminating in a passage extending vertically and connecting with the bowl and the trap, and an inlet passage at the rear of the body of the hopper and extending downwardly and connecting with the vertical passage.

In testimony whereof I hereunto affix my signature.

WALTER G. MUNKEL.